United States Patent
Asada et al.

(10) Patent No.: US 7,376,105 B2
(45) Date of Patent: May 20, 2008

(54) SOURCE CODING FOR INTERFERENCE REDUCTION

(75) Inventors: Haruhiko H. Asada, Lincoln, MA (US); Chun-Hung Liu, Cambridge, MA (US); Erin Cem, Cambridge, MA (US); Kai-Yeung Siu, Charlestown, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 1131 days.

(21) Appl. No.: 10/236,058

(22) Filed: Sep. 5, 2002
(Under 37 CFR 1.47)

(65) Prior Publication Data

US 2003/0115533 A1    Jun. 19, 2003

Related U.S. Application Data

(63) Continuation-in-part of application No. 09/378,411, filed on Aug. 20, 1999, now Pat. No. 6,553,535.

(60) Provisional application No. 60/317,691, filed on Sep. 6, 2001, provisional application No. 60/097,460, filed on Aug. 21, 1998.

(51) Int. Cl.
*H04B 7/216* (2006.01)
*H04B 1/04* (2006.01)

(52) U.S. Cl. .................. 370/335; 370/342; 370/441; 445/501; 445/63.1; 445/114.2

(58) Field of Classification Search ........... 370/335, 370/342, 441; 455/522, 574, 67.11, 67.12, 455/67.13, 67.16, 68, 501, 63.1, 114.2
See application file for complete search history.

(56) References Cited

U.S. PATENT DOCUMENTS 4,077,021 A    2/1978  Csajka et al. ............ 332/9 R
(Continued)

FOREIGN PATENT DOCUMENTS

DE       197 48 880 C1    5/1999

(Continued)

OTHER PUBLICATIONS

Chen, T-T., et al., "TCM/SSMA Communication Systems with Cascaed Sequences and PAM/QAM Signal Sets," *IEEE Transactions on Communications*, IEEE Inc., New York, vol. 46, No. 7, pp. 950-956, Jul. 1, 1998.

(Continued)

*Primary Examiner*—Rickey Q. Ngo
*Assistant Examiner*—Chandrahas Patel
(74) *Attorney, Agent, or Firm*—Bromberg & Sunstein LLP (57) ABSTRACT

A method of encoding a transmission signal to reduce multiple access interference at a receiver. A data source signal including a plurality of source symbols is received into a transmitter. The source symbols are encoded using low energy encoding forming encoded codewords. An identifying pattern is applied to the encoded codewords forming a transmission signal. In one embodiment, the identifying pattern is a unique pseudo-random pattern identifying the data source. Once the pattern has been added, multiple transmission signals can be summed together and then modulated onto a carrier wave. The transmission signals are then transmitted on the carrier wave which is at a preselected frequency. The low energy encoding format is such that a sequence of signals forming codewords is created. Each sequence of signals is characterized by an energy and normally a high bit consumes energy whereas a low bit requires substantially less energy.

22 Claims, 8 Drawing Sheets

U.S. PATENT DOCUMENTS

| | | | |
|---|---|---|---|
| 4,396,906 A | 8/1983 | Weaver | 340/347 DD |
| 4,513,403 A | 4/1985 | Troy | 367/83 |
| 4,562,426 A | 12/1985 | Forney, Jr. | 340/347 DD |
| 4,630,288 A | 12/1986 | Longstaff et al. | 375/261 |
| 4,733,401 A | 3/1988 | Longstaff | 375/37 |
| RE32,905 E * | 4/1989 | Baran | 370/320 |
| RE33,056 E | 9/1989 | Forney, Jr. et al. | 375/39 |
| 4,882,733 A | 11/1989 | Tanner | 371/43 |
| 4,907,278 A | 3/1990 | Cecinati et al. | 704/246 |
| 4,922,507 A | 5/1990 | Simon et al. | 375/254 |
| 5,062,152 A | 10/1991 | Faulkner | 359/185 |
| 5,091,955 A * | 2/1992 | Iseda et al. | 704/230 |
| 5,363,407 A | 11/1994 | Ramesh et al. | 375/254 |
| 5,533,062 A | 7/1996 | Liberti et al. | 375/334 |
| 5,544,167 A * | 8/1996 | Lucas et al. | 370/342 |
| 5,559,561 A | 9/1996 | Wei | 348/470 |
| 5,606,580 A * | 2/1997 | Mourot et al. | 375/340 |
| 5,615,226 A | 3/1997 | Lipa | 375/147 |
| 5,689,248 A | 11/1997 | Esfahani et al. | 340/853.1 |
| 5,742,678 A * | 4/1998 | Dent et al. | 380/270 |
| 5,748,103 A | 5/1998 | Flach et al. | 340/870.07 |
| 5,805,573 A * | 9/1998 | Umeda | 370/321 |
| 5,832,026 A | 11/1998 | Li | 375/136 |
| 5,903,676 A | 5/1999 | Wu et al. | 382/244 |
| 5,914,933 A * | 6/1999 | Cimini et al. | 370/208 |
| 5,964,701 A | 10/1999 | Asada et al. | 600/300 |
| 6,052,390 A * | 4/2000 | Deliot et al. | 370/528 |
| 6,081,555 A | 6/2000 | Olafsson | 375/242 |
| 6,118,826 A | 9/2000 | Zehavi et al. | 375/261 |
| 6,144,711 A * | 11/2000 | Raleigh et al. | 375/347 |
| 6,157,678 A | 12/2000 | Wei | 375/243 |
| 6,160,837 A * | 12/2000 | Bruno et al. | 375/130 |
| 6,222,833 B1 * | 4/2001 | Seo | 370/342 |
| 6,226,317 B1 * | 5/2001 | Bruckert et al. | 375/146 |
| 6,285,655 B1 * | 9/2001 | Lundby et al. | 370/209 |
| 6,366,570 B1 * | 4/2002 | Bhagalia | 370/342 |
| 6,421,733 B1 * | 7/2002 | Tso et al. | 709/246 |
| 6,529,730 B1 * | 3/2003 | Komaili et al. | 455/452.2 |

FOREIGN PATENT DOCUMENTS

| | | |
|---|---|---|
| EP | 0 852 438 A2 | 7/1998 |
| EP | 1 069 798 A1 | 1/2001 |
| WO | WO 94/16769 | 8/1994 |
| WO | WO 99/19790 | 4/1999 |
| WO | WO 00/11845 | 3/2000 |

OTHER PUBLICATIONS

*International Search Report*, dated Nov. 20, 2002, received Nov. 26, 2002.

Yoon, Y.C. "Spread-spectrum multi-access system with co-channel interference cancellation for multipath fading channel," *IEEE J. Selected Areas Communications*, vol. 11, No. 7, pp. 1067-1075, May 1992.

S. Verdu "Minimum probability of error for asynchronous Gaussian multiple-access channels," *IEEE Trans. Inform. Theory*, vol. IT-32, pp. 85-86, Jan. 1986.

C. Erin and H. Asada "Energy optimal codes for wireless communications," *Proc. Of the 38th IEEE Conference on Decision and Control*, vol. 5, pp. 4446-4453, 1999.

C. Erin, et al. "Minimum energy coding for RF Transmission," *IEEE WCNC*, vol. 2, pp. 621-625, 1999.

K. Yao "Error probability of asynchronous spread spectrum multiple access communication systems," *IEEE Trans. Commun.*, vol. COM-25, pp. 803-809, Aug. 1997.

K.B. Letaief "Efficient Evaluation of the Error Probabilities of Spread-Spectrum Multiple-Access Communications," *IEEE Trans. Commun.*, vol. 45, pp. 239-246, Feb. 1997.

M.B. Pursley "Performance Evaluation of Phase-Coded Spread Spectrum Multiple-Access Communication," *IEEE Trans. Commun.*, vol. COM-25, pp. 800-803, Aug. 1977.

Stephen B. Wicker, "Error Control Systems for Digital Communication and Storage", Prentice-Hall, 1995.

Nilo Casimiro Ericsson, "Adaptive Modulation and Scheduling for Fading Channels", Global Telecommunications Conference-Globecom '99.

Agrawal, P., et al., "An Adaptive Power Control and Coding Scheme for Mobile Radio Systems," IEEE, pp. 283-288, 1986.

Ayanoglu, Ender, et al., "Airmail: A Link-Layer Protocol for Wireless Networks," Wireless Networks, pp. 47-60, 1995.

Bambos, Nicholas, "Toward Power-Sensitive Network Architectures in Wireless Communications: Concepts, Issues, and Design Aspects," IEEE Personal Communications, pp. 50-59, Jun. 1998.

Biglieri, Ezio, et al., "Coding and Modulation Under Power Constraints," IEEE Personal Communications, pp. 32-39, Jun. 1998.

Campopiano, C.N., "A Coherent Digital Amplitude and Phase Modulation Scheme," IRE Transactions on Communications Systems, pp. 90-95, Mar. 1961.

Forney, Jr., David G., et al., "Efficient Modulation for Brand-Limited Channels," IEEE Journal on Selected Areas in Communications, vol. SAC-2, No. 5, pp. 632-647, Sep. 1984.

Imai, Hideki, "A New Multilevel Coding Method Using Error-Correcting Codes," IEEE Transactions on Information Theory, vol. IT-23, No. 3, pp. 371-377, May 1977.

Lang, Gordon R., et al., "A Leech Lattice Modem," IEEE Journal on Selected Areas in Communications, vol. 7, No. 6, pp. 968-973, Aug. 1989.

Lettieri, Paul, et al., "Low Power Error Control for Wireless Links," Mobicom 97 Budapest Hungary, pp. 139-150, 1997.

Ma, Howard H., "On Tail Biting Convolutional Codes," IEEE Transactions on Communications, vol. COM-34, No. 2, pp. 104-111, Feb. 1986.

Sayegh, Soheil I., "A Class of Optimum Block Codes in Signal Space," IEEE Transactions on Communications, vol. COM-34, No. 10, pp. 1043-1045, Oct. 1986.

Ungerboeck, Gottfried, "Channel Coding with Multilevel/Phase Signals," IEEE Transactions on Information Theory, vol. IT-28, No. 1., pp. 55-67, Jan. 1982.

Ungerboeck, Gottfried, "Trellis-Coded Modulation with Redundant Signal Sets Part I: Introduction", IEEE Communications Magazine, vol. 25, No. 2, pp. 5-11, Feb. 1987.

Ungerboeck, Gottfried, "Trellis-Coded Modulation with Redundant Signal Sets Part II: State of the Art," IEEE Communications Magazine, vol. 25, No. 2, pp. 12-21, Feb. 1987.

Zorzi, Michele, et al., "Energy-Constrained Error Control for Wireless Channels," IEEE Personal Communications, pp. 27-33, Dec. 1997.

Glen G. Langdon, Jr., "An Introduction to Arithmetic Coding" IBM Res. Develop. vol. 28, No. 2 Mar. 1984, pp. 135-149 XP-002086019.

W.B. Pennebaker, et al., "An Overview of the Basic Principles of the Q-coder Adaptive Binary Arithmetic Coder" IBM Journal of Research and Development, vol. 32, No. 6, Nov. 1988, pp. 717-726 XP 000111384.

\* cited by examiner

FIG. 1

| CODEWORD | $m_1$ | $m_2 \cdots m_{L+1}$ | $m_{L+2} \cdots$ | ... | $\cdots m_q$ | $m_{2^L}$ |
|---|---|---|---|---|---|---|
| NUMBER OF CODEWORDS | $C_L^0$ | $C_L^1$ | $C_L^2$ | | $C_L^{L-1}$ | $C_L^L$ |
| CODEWORD PATTERN | | | | | | |

SOURCE CODING FOR INTERFERENCE REDUCTION

CROSS REFERENCE TO RELATED APPLICATIONS

The present application claims priority from U.S. Provisional Patent Application No. 60/317,691 entitled "Source Coding for Interference Reduction In DS-CDMA Communications" filed on Sep. 6, 2001 and is also a Continuation-in-Part of U.S. patent application Ser. No. 09/378,411 filed on Aug. 20, 1999 entitled "Power Efficient Communication Protocol" which is based on U.S. Provisional Patent Application No. 60/097,460 entitled "Power Efficient Coding Protocol" filed on Aug. 21, 1998 all of which are incorporated by reference herein in their entirety.

TECHNICAL FIELD AND BACKGROUND ART

The present invention relates to multiple access systems and more specifically to encoding techniques for multiple access systems. In a general DS-CDMA system the multiple access interference (MAI) in each receiver increases along with the number of users in the system and therefore the capacity of a given frequency is limited.

Prior art methods and systems have looked to MAI cancellation and have focused on the receiver. For example, S. Verdu, "Minimum probability of error for asynchronous Gaussian multiple-access channels," *IEEE Trans. Inform. Theory*, Vol. IT-32, pp. 85-86, January 1986 reported a receiver that outperforms a linear correlation receiver. In these receiver designs, however, the computational complexity exponentially increases with the number of transmitters.

SUMMARY OF THE INVENTION

In a first embodiment of the invention there is provided a method of encoding a transmission signal to reduce multiple access interference at a receiver. A data source signal including a plurality of source symbols is received into a transmitter. The source symbols are encoded using low energy encoding forming encoded codewords. An identifying pattern is applied to the encoded codewords forming a transmission signal. In one embodiment, the identifying pattern is a unique pseudo-random pattern identifying the data source. Once the pattern has been added, multiple transmission signals can be summed together and then modulated onto a carrier wave. The transmission signals are then transmitted on the carrier wave which is at a pre-selected frequency. The low energy encoding format is such that a sequence of signals forming codewords is created wherein the length of the codewords is greater than a traditional binary format such that the length of the codewords in an alphabet of 256 source symbols would be greater than 8 bits. Each sequence of signals is characterized by an energy and normally a high bit consumes energy whereas a low bit requires substantially less energy. As such, the redundant bits allow for the creation of codes that reduce the number of transmitted high bits and therefore reduce the multiple access interference. In this method, each codeword signifies a specified source symbol on the basis of a mapping between source symbols and codewords mapped such that each symbol of lower probability of occurrence is associated with a codeword of at least equal energy.

At the receiver, a modulated signal having multiple transmitted signals thereon is received wherein each transmitted signal is encoded using low energy encoding. The receiver identifies a transmitted signal according to a unique identifying pattern within the signal and the transmitted signal is decoded using low energy decoding. The methodology as described may be used with a code division multiple access system.

The capacity of a frequency in a code division multiple access system is determined by selecting a length for low energy encoding. Then based upon the system's bit energy to noise ratio a maximum number of transmitters can be determined. Such a capacity can be communicated to a control module so that transmitters will limit assignment to selected frequencies such that the number of transmission signals is below that of the maximum determined.

The length of the codewords may be determined based upon system parameters and the number of source symbols in the alphabet. The length of a codeword may be determined by obtaining a signal to noise ratio for a frequency and determining a binary length based upon the number of source symbols. A critical length is then determined. The critical length can be determined by substituting the binary length and the signal to noise ratio into a formula or through a look-up table. The codeword length for low energy encoding is set at or below the critical length. It should be understood that other system parameters may be used to calculate the critical length such as the number transmission signals for a frequency and the bit energy to noise ratio fro the system. The critical length may be determined for example using the formula $$L_c = \frac{L_b}{1-\alpha_1} \exp[(1-\alpha_1)SNR_{LE}].$$

The method as described may be embodied on a computer program product for use with a computer wherein the computer program product has computer readable code thereon. The method may also be embodied in a system wherein the system includes a low energy data source encoder for encoding a data source into codewords using low energy encoding. Additionally the system has a pseudorandom pattern generator wherein each pseudorandom generator adds a pseudorandom signal to the codewords for the data source forming a transmission signal and a modulator for modulating each transmission signal on a carrier frequency. The system also includes a summer module for summing transmission signals prior to modulation. The system may include a plurality of pseudorandom pattern generators and a plurality of low energy encoding modules so that parallel processing may occur. Similarly, there may be a decoder system that includes a signal receiver that receives the modulated signal and performs demodulation. The decoder system also has low energy decoder module. A desired transmission signal is identified by its unique pseudorandom signal and is sent through a correlation process. After the desired transmission signal is separated out, the decoder decodes the transmission signal and the original source symbols are retrieved from the codewords using a look-up table.

BRIEF DESCRIPTION OF THE DRAWINGS

The foregoing features of the invention will be more readily understood by reference to the following detailed description, taken with reference to the accompanying drawings, in which.

DETAILED DESCRIPTION OF SPECIFIC EMBODIMENTS

In a CDMA system multiple data sources are transmitted on a single carrier frequency. A pseudo-random pattern generator adds a unique pseudo-random pattern to each data source signal in order to provide an identifier of the data source at the receiver. This unique pattern is added prior to all data sources being combined and prior to the combined data sources being transmitted to a receiver. This pseudo-random pattern is a spreading signal that has a chip rate that is orders of magnitude greater than the bit rate of the source. Each data source has its own unique pseudo-random pattern that is approximately orthogonal to all other patterns. This allows the receiver in such a system to perform a time correlation operation to detect only the specific desired pattern and thus identify the data source. All other patterns appear as noise due to decorrelation. The receiver can then demodulate the chip pattern from the data source and the data source is recovered.

Figure 1:
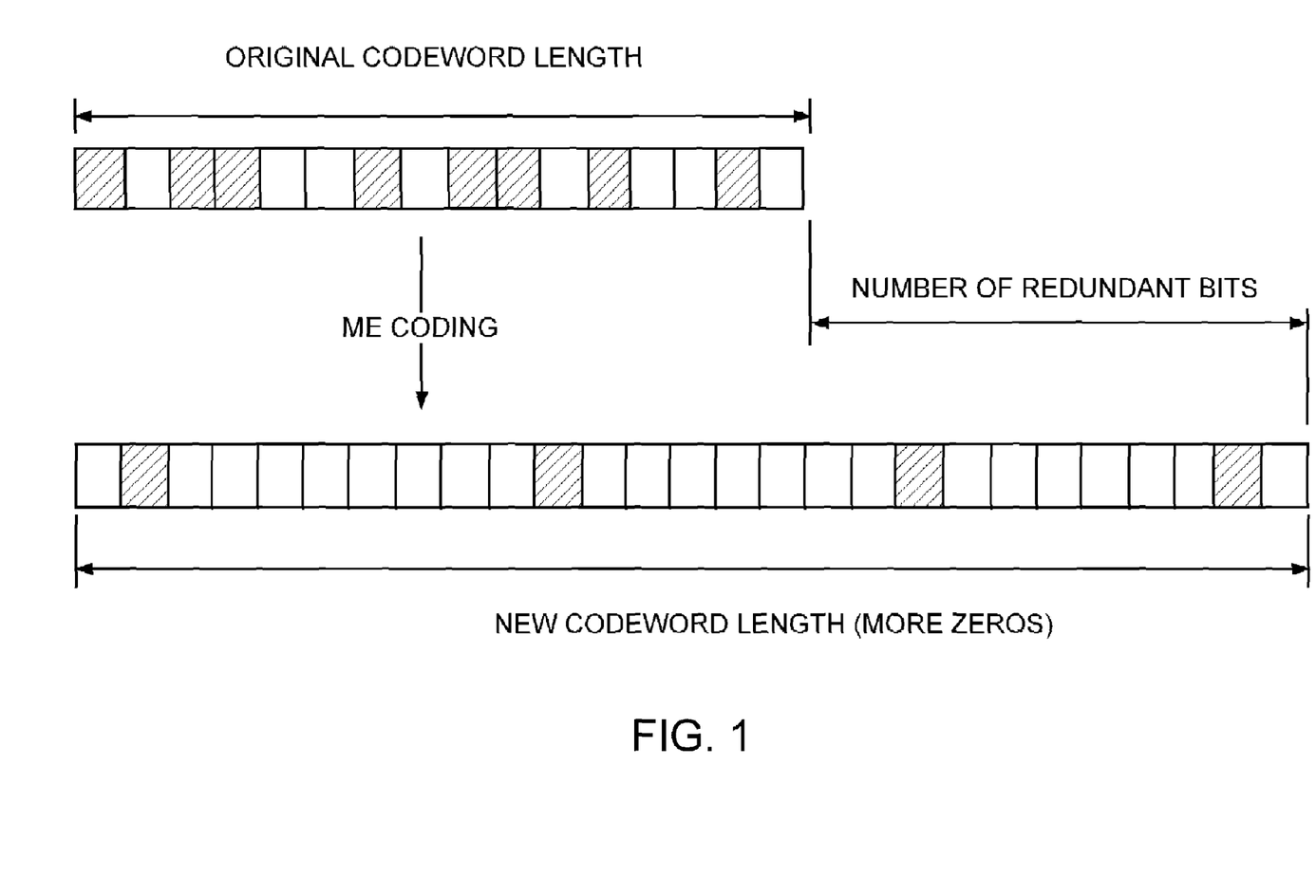
FIG. 1 graphically represents the principle of the encoding technique which will be referred to as low energy encoding.

At the transmitter after having the pseudo-random pattern added, all of the data sources are combined and then modulated on a carrier frequency. In this invention a further encoding technique is employed prior to adding the pseudo-random pattern in order to reduce multiple access interference. As expressed above, multiple access interference occurs as more and more data sources are added at the transmission side of a code division multiple access system. When a receiver performs the time correlation to retrieve a data source based on the pseudo-random pattern, the data sources other than the desired data source appear as noise. As more sources are added, the noise floor is increased and at a point the noise floor becomes so high that the desired data source cannot be identified from the noise. The increased noise occurs as the result of multiple data sources sending high bits of information at the same time. The additional coding technique reduces the number of sent high bits and thus decreases the amount of MAI, therefore allowing the number of data sources to be increased for a single transmission carrier frequency without the need for changing the receiver or increasing the signal power to increase the signal to noise ratio. The encoding provides a lower energy transmission per codeword on average as compared to a standard binary transmission system (e.g. an 8 bit codeword corresponds to 256 possible source symbols in a standard binary transmission). The additional encoding technique is based on on-off keying. In on-off keying power is consumed when a high bit is transmitted. In this encoding technique additional bits are added as compared to that of a standard binary transmission. Since there are additional bits available, a set of codewords that contain fewer high bits to represent the same number of source symbols can be constructed. FIG. 1 graphically represents the principle of the encoding technique which will be referred to as low energy encoding.

Figure 2:
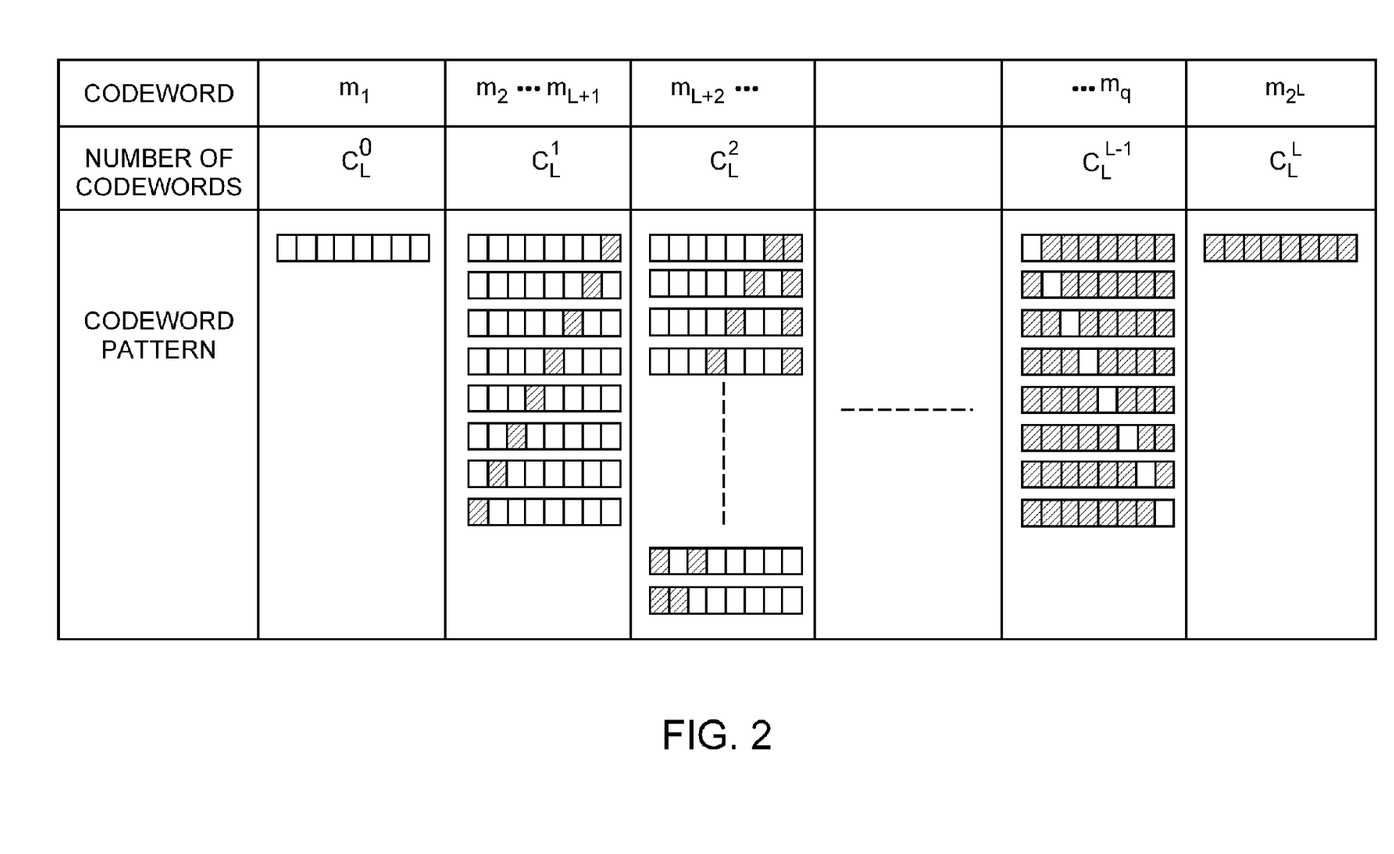
FIG. 2 shows the entire set of usable codewords sorted by the number of high bits for low energy encoding.

Low energy encoding is generated through two distinct steps which are codebook optimality and coding optimality. The former step requires determining a set of codewords, minimizing the high bits, and the latter step requires assigning codewords having less high bits to symbols with higher probability of occurrence. FIG. 2 shows the entire set of usable codewords sorted by the number of high bits, $M_0=\{m_1, \ldots, m_{2^L}\}$. The total number of usable codewords is $2^L$. The first column has only $C_L^0=1$ codeword with zero high bits; the second column has $C_L^1=L$ with one high bit; the third column has $C_L^2$ containing two high bits and so on. All the codewords are number 1 through $2^L$ in the ascending order of the number high bits. The last codeword, $m_{2^L}$ consists of all high bits. In order to reduce the amount of energy used and thus the amount of power that is received at a receiver, codewords abounding in high bits are not preferred. For example, $m_{2^L-1}$ or $m_{2^L}$ which have only one or zero low bits respectively, produce the most MAI.

Figure 3:
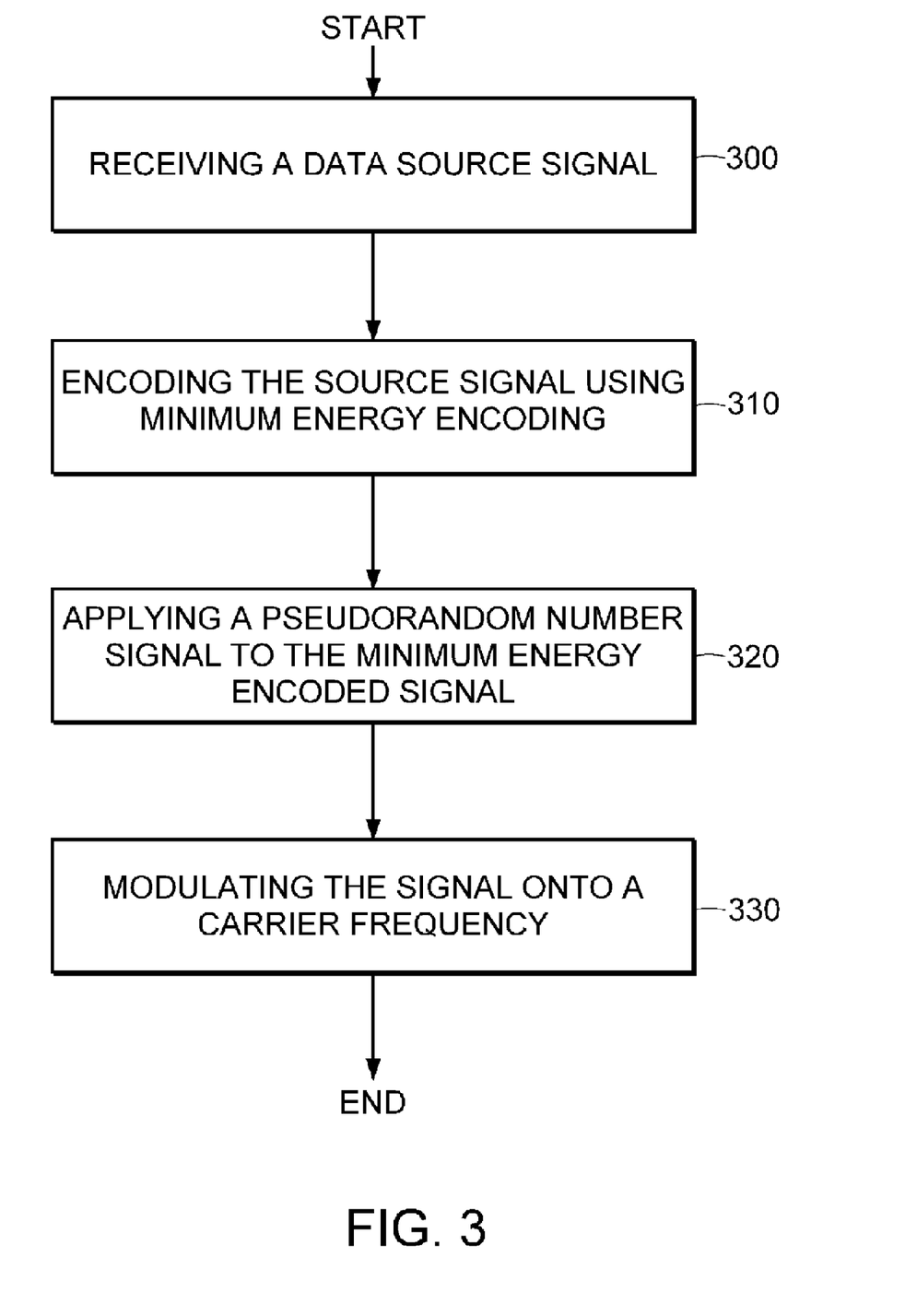
FIG. 3 is flow chart of a method for encoding a code division multiple access signal in order to reduce multiple access interference that more formally explains one embodiment of the invention.

FIG. 3 is flow chart that more formally explains one embodiment of the invention. First a data source signal is received 300. The data source signal contains a number of source symbols within the signal. The source symbols may be ASCI symbols or letters of the alphabet for example. Associated with each source symbol is a known probability of occurrence. The known probability may be statistically based upon other data sources or more locally determined based upon the actual data source. The system then encodes the source signal using the low energy encoding technique 310. A length is first calculated for the codewords. The length should be longer than that of a standard binary encoder. Adopting an excessively long codeword results in traffic congestion within the communication network and increases the error probability that a codeword will be decoded incorrectly by the receiver. A method for determining a length that maximizes the decrease in energy usage while maintaining a reasonable error probability will be provided below.

Once a length is selected, that is longer than standard binary encoding, codewords are associated with source symbols. The source symbol having the highest probability of occurrence is provided with the codeword exhibiting the least amount of energy. For example, if the length of the codewords is 10 bits the source symbol having the highest probability of occurrence would be associated with a code word of all zeros having the lowest power transmission (0000000000). Similarly a source symbol having the next highest probability of occurrence would be associated with a codeword that had only one high bit. Similarly, the next nine source symbols having the next nine highest probabilities of occurrence would be associated with codewords with only one high bit (0000000001, 0000000010, 0000000100, 0000001000, etc.) It could be imagined that other keying could be used in place of on-off keying, but in any event the highest probability source symbol should be associated with the codeword that produces the lowest power output when transmitted.

Once each source symbol is associated with a codeword, a pseudo-random number signal is added to the low energy encoded signal 320. This is achieved by using a unique chip signal that has a frequency that is much greater than that of the encoded data source. This unique chip signal allows multiple data sources to be transmitted on the same frequency. Once the low energy encoded signal and the pseudo-random chip pattern are integrated, the resulting encoded signal is modulated onto the carrier frequency for transmission into the transmission channel 330. It should be understood that each low energy encoded data source is assigned a unique pseudo-random chip signal for identification purposes and that multiple data sources are combined and modulated on the same frequency.

Figure 4:
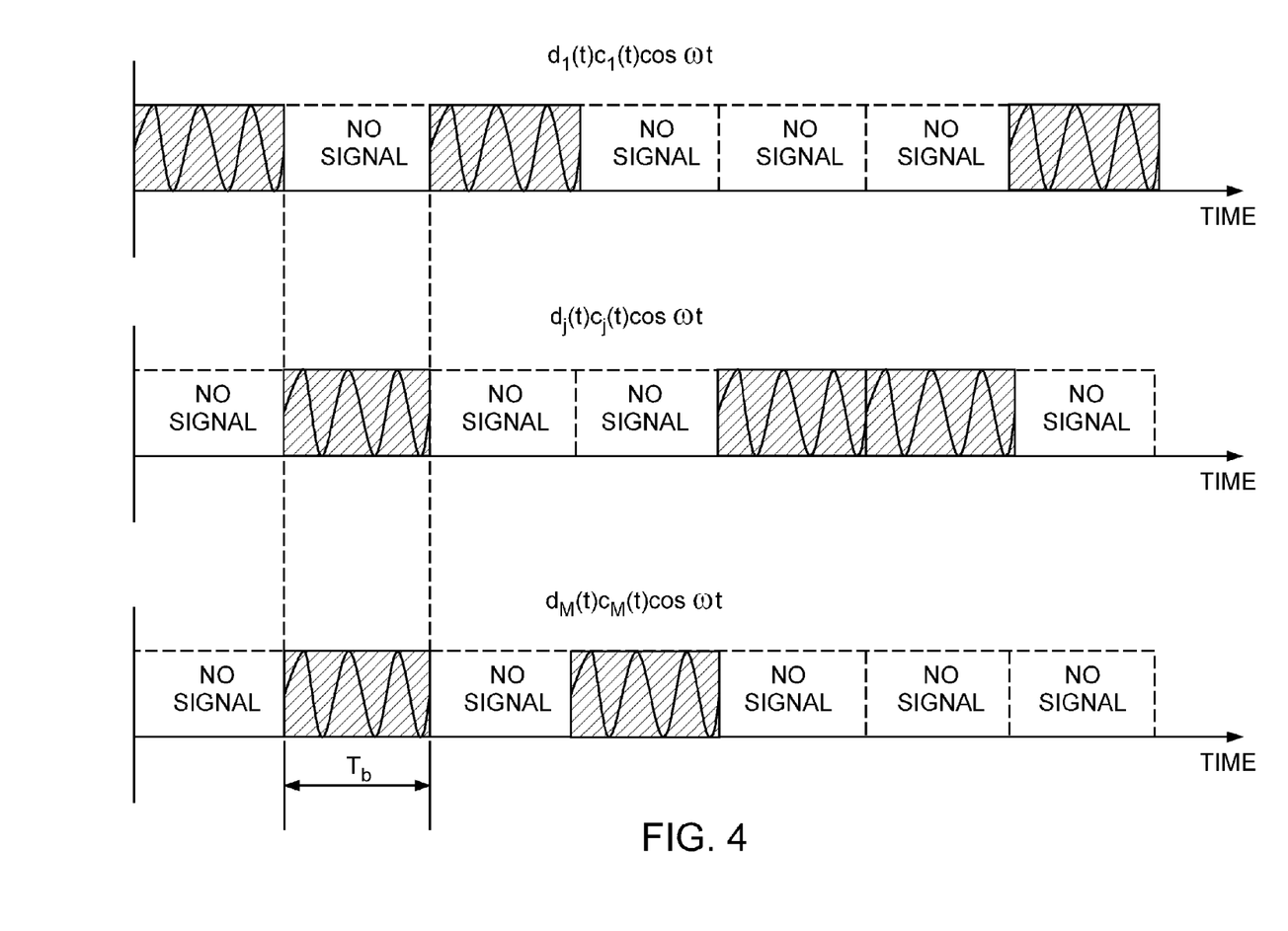
FIG. 4 is a graphic showing multiple data signals being transmitted at the same time using low energy encoding such that very few high bits are transmitted simultaneously thereby reducing the MAI at the receiver.

FIG. 4 shows multiple data signals that have been low energy encoded being transmitted at the same time such that very few high bits are transmitted simultaneously thereby reducing the MAI at the receiver. In the figure d(t) represents the original data source data encoded by low-energy encoding, c(t) represents the unique pseudo-random chirping pattern signal and cos ωt is the carrier frequency used for transmitting the signals to the receiver.

Figure 5:
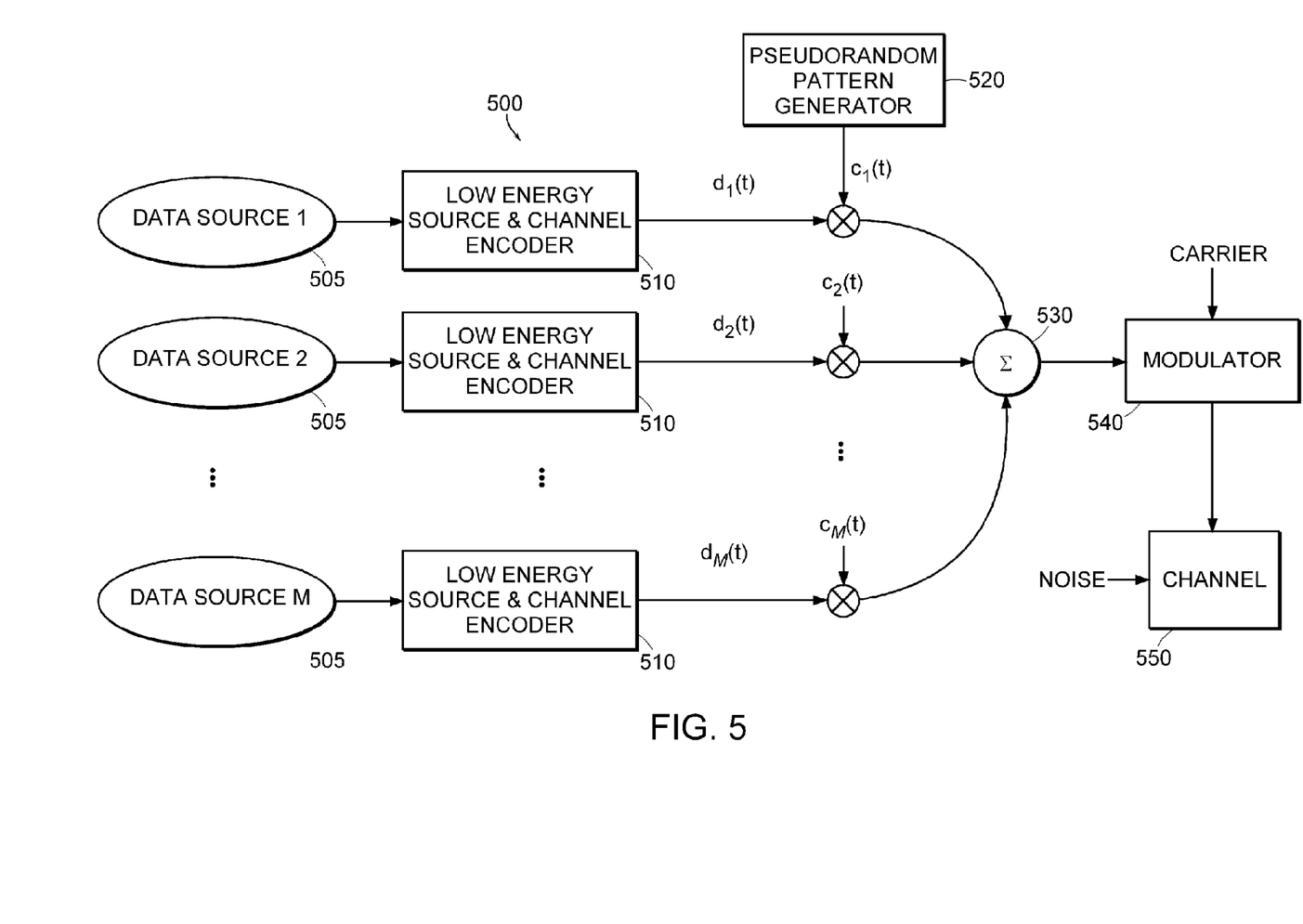
FIG. 5 shows one embodiment of a system for transmission of a code division multiple access signal encoded with low energy encoding.

A system for transmitting a CDMA signal that is low energy encoded is shown in FIG. 5. Multiple data sources 505 are provided to the transmission system 500. Each data source is passed to a low energy encoder module 510. The low energy encoder module 510 associates the source symbols of the data source with codewords. First a codeword length is determined. This length may be predetermined and associated with the low energy encoder or it may be calculated by the low energy encoder. The method for determining the length of the codewords is provided below with respect to FIG. 7. The codewords are assigned such that the energy of the codeword is associated in reverse order with the probability of occurrence of the source symbol. For example, for source symbols having 35%, 25%, 20%, 10%, 7%, and 3% probability of occurrence wherein the codewords have an associated length of 4 the code word source symbol association would be (35% 0000), (25% 0001), (20% 0010), (10% 0100), (7% 1000) and (3% 0011). The association is such that higher probabilities are associated with lower energies. The source symbol having a 25% probability could have just as easily been associated with codeword 0010.

The low energy encoder module 510 may maintain in a look-up table a listing of the probability of occurrence for a source symbol. The probability of occurrences may be transmitted in conjunction with the data source, or the low energy encoder may determine the probability of occurrence based upon the received data source, by tabulating the occurrence of each source symbol as the source symbols are processed. In such embodiments, the assignment of codewords and source symbols is performed each time a data source is presented to the system for transmission and the association is then stored in a look-up table (LUT). In other embodiments, this association between codewords and source symbols is predetermined and stored in a LUT. Once the association between the source symbols and codewords has occurred, the low energy encoder module 510 then identifies the source symbols received in the data source signal stream. The low energy encoding module 510 accesses the LUT and selects the appropriate codeword based upon the identified source symbol. The codeword is then passed in a streaming fashion to the pseudo-random pattern generator module 520. The pseudo-random pattern generator module 520 multiplies the encoded data source signals with unique chip signals c(t) that aid in identifying the data source upon decoding. Pseudo-random pattern generator modules are known to those of ordinary skill in the art and need not be elaborated on here.

All of the encoded signals are then summed in a summer module 530 which in turn passes the summed signals to a modulator 540 for placing the summed signals on a carrier frequency. The modulator 540 than transmits the modulated signal into a network channel 550.

Figure 6:
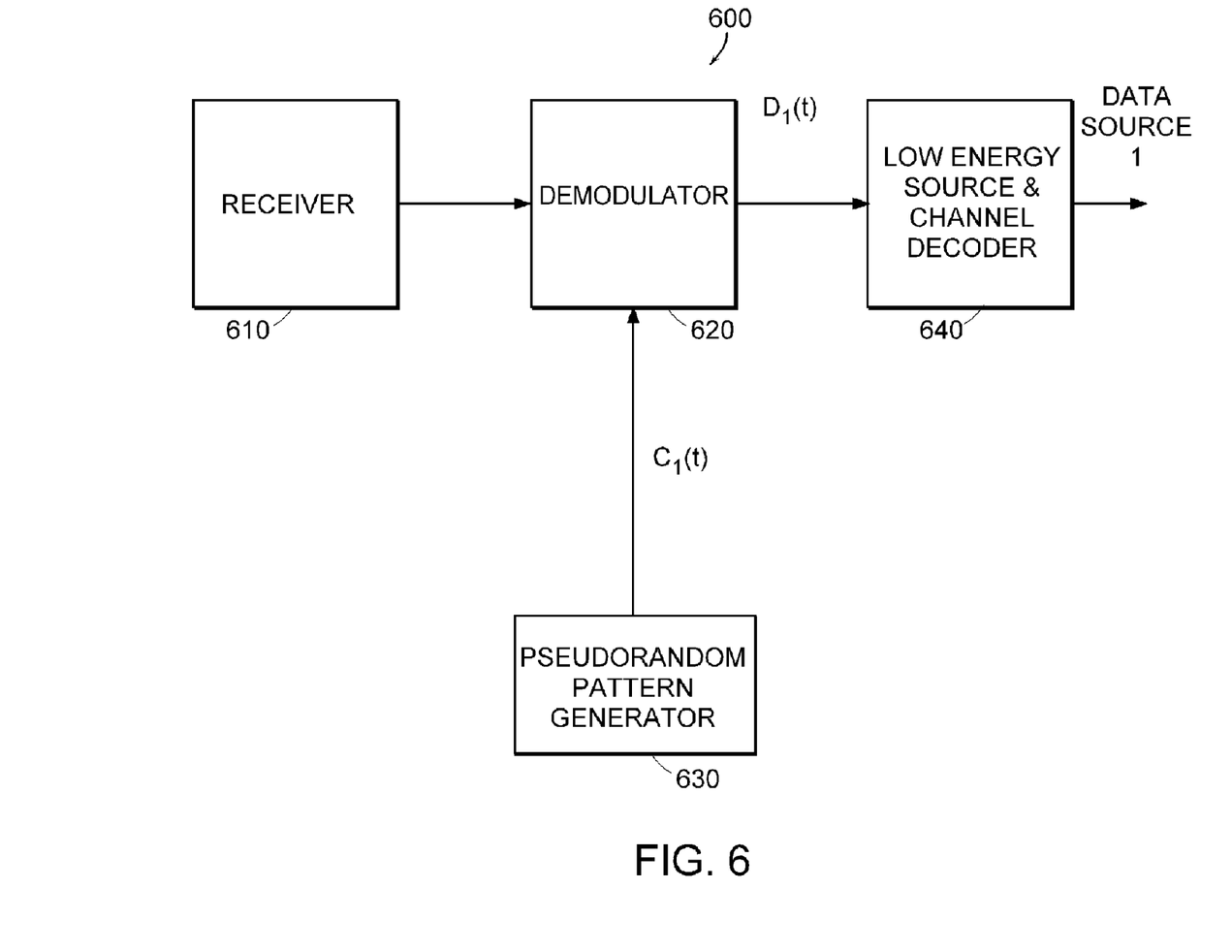
FIG. 6 shows one embodiment of a system for receiving a modulated signal transmitted by the system of FIG. 5.

FIG. 6 shows the system for receiving a modulated signal from the transmission system of FIG. 5. A receiver module 610 of the receiver system 600 receives the modulated signal. The receiver 610 demodulates the summed signal from the carrier frequency and passes the summed signal to a demodulator 620. A pseudo-random pattern generator 630 which operates in the same manner as the pseudo-random pattern generator 520 in the transmitter produces a unique pattern for a desired data source. That unique pattern is then used in the demodulation process. For instance, if data source 1 is to be identified and demodulated the pseudo-random pattern generator 630 generates the same pseudo-random pattern that was used to encode data source 1 originally. The demodulator 620 performs a correlation whereby the only signal that is retrieved is the signal for data source 1 and the other data source signals appear as noise. The data source signal is then passed to a low energy decoder module 640. The low energy decoder module 640 performs the inverse task of the encoder 510 and associates the identified codewords in the stream with the source symbols. The low energy decoder module 640 includes a LUT which has the same associations between codewords and source symbols as that of the receiver 500. The low energy decoder 640 therefore identifies the codeword in the stream, performs a look-up function with the LUT and then outputs a source symbol that corresponds to the codeword. The stream of source symbols that is output from the low energy decoder 640 is associated with a particular data source such as data source 1 as shown in the FIG. 6.

In an ideal environment the length of the codewords could continually be extended in order to reduce the likelihood that multiple transmitters would be transmitting high bits simultaneously. However, factors such as network congestion and transmission error counter such an extension. As a result, the length needs to be based in part on the necessary transmission rate and should balance the probability of codeword error with the benefit of reduced MAI. The length therefore is based upon the given system performance and the transmission rate. A theoretical model for the performance of a DS-CDMA system with BPSK modulation and MAI cancellation has been developed with regard to average bit error probability Y. C. Yoon, R. Kohno and H. Imai, "Spread-spectrum multi-access system with co-channel interference cancellation for multipath fading channel," *IEEE J. Selected Areas Communication*, Vol. 11, No. 7, pp. 1067-1075, May 1992 which is incorporated by reference herein in its entirety.

The error probability per bit which for a low energy encoded system can be shown to be approximately $P_b \cong (1-\alpha_1)Q(\sqrt{SNR_{ME}})$ where $$Q(x) = \frac{1}{\sqrt{2\pi}} \int_x^\infty e^{\frac{u^2}{2}} du.$$

From this, the probability that an error occurs in a codeword can be estimated such that $P_{cw} = L \cdot P_b$. To find the critical length of a codeword for low energy encoded transmission compared to a binary transmission case, such as BPSK, the error probabilities for an error in a codeword for both cases are compared such that $L_{LE}(1-\alpha_1)Q(\sqrt{SNR_{LE}}) \geq L_b Q(\sqrt{SNR_{BPSK}})$ where Q(x) cannot be expressed in an explicit form but can be bounded by $\exp(x^2/2)$. Thus the critical length can be expressed as $$L_c = \exp\left\{-\left(\frac{SNR_{BPSK} - SNR_{LE}}{2}\right)\right\} \frac{L_b}{1-\alpha_1}$$

and reduced to $$L_c = \frac{L_b}{1-\alpha_1} \exp[(1-\alpha_1)SNR_{LE}]$$

where $L_b$ is the minimum length for a binary representation of the possible source symbols. For example if there are 8 source symbols, the binary length would be 3. $\alpha_1$ is the percentage of high bits for the data source $d_1$ during a transmission duration of T seconds.

$$SNR_{LE} = \left[\alpha_1\left(\frac{M-1}{3N} + \frac{N_0}{2E_b}\right)\right]^{-1}$$

where M is the number of transmitters and N is the number of source symbols/codewords. From the above the critical length can be determined. Once the critical length is found, the length $L_{LE}$ for the codewords for low energy encoding is set at a length that is equal to or less than the critical length.

Figure 7:
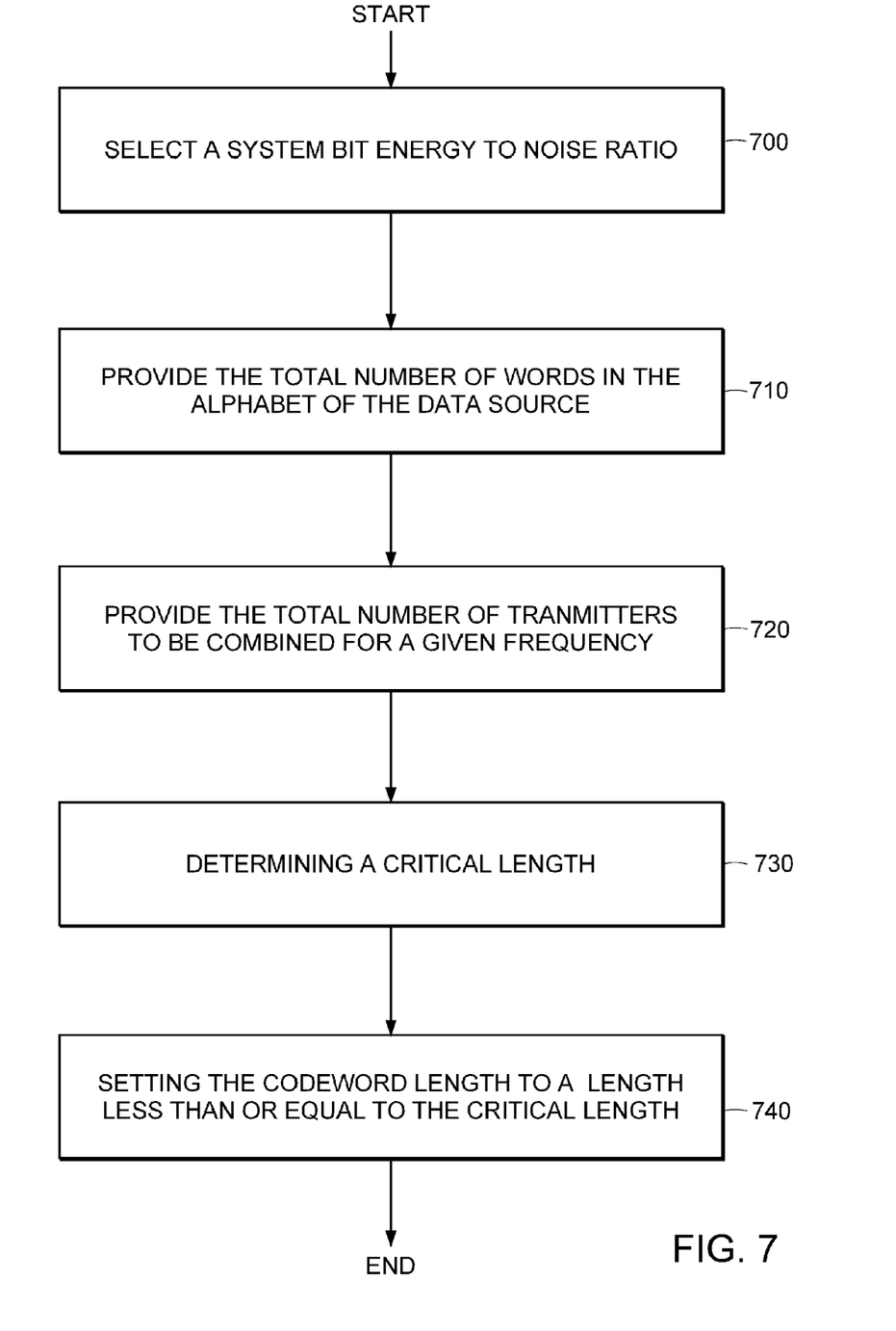
FIG. 7 is a flow chart showing one embodiment for calculating a length for the low energy encoded codewords.

FIG. 7 is a flow chart showing the steps that are necessary for determining the length of the codewords. First the $E_b/N_0$, the bit energy to noise ratio for the system is selected (700). This value may be predefined as a result of the transmitter and receiver design. The number of different source symbols is also determined (N) (710). Again this value is likely predefined and is dependent on the communication scheme. The total number of transmitters is selected (M) (720). From this information, the critical length can be determined (730). The $SNR_{LE}$, is determined with the variables N, M and $E_b/N_0$ for a given $\alpha_1$. Knowing the $SNR_{LE}$, a simple substitution produces a value for $L_c$. Based upon the critical length the codeword length is selected to be equal to or less than the critical length (740).

Figure 8:
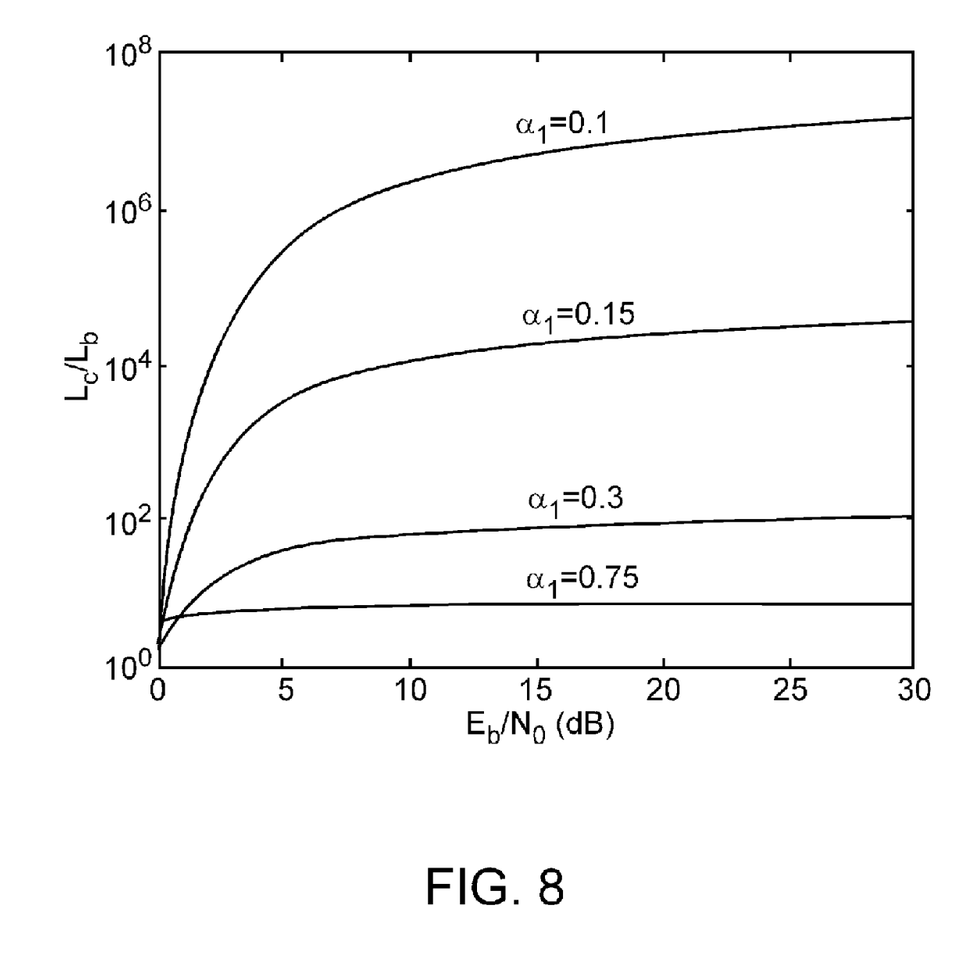
FIG. 8 is a graph showing the ratio of $L_c/L_b$ versus $E_b/N_0$.

FIG. 8 is a graph showing the relationship between the ratio of the critical length to the binary length versus the system parameter $E_b/N_0$. The graph is done for variations in $\alpha_1$ for M=50 and N=63. For example, from FIG. 8 it is known that $L_c = 10^4 L_b$ if $\alpha_1 = 0.15$ and $E_b/N_0 = 10$ dB. If the minimum transmission rate $R_{min}$ is also given, the length of a LE codeword can be determined based on the rule: $L_{LE} \leq \min(10^4 L_b, R_{min} T_b)$ where $T_b$ is the bit duration. Thus, as previously stated the length depends on the system design parameters and the transmission rate. Using the same equation and knowing the system bit error to noise ratio, presuming a length of the codewords and the transmitting a high bit, the number of possible transmitters for a given system can be calculated.

It should be noted that the flow diagrams are used herein to demonstrate various aspects of the invention, and should not be construed to limit the present invention to any particular logic flow or logic implementation. The described logic may be partitioned into different logic blocks (e.g., programs, modules, functions, or subroutines) without changing the overall results or otherwise departing from the true scope of the invention. Oftentimes, logic elements may be added, modified, omitted, performed in a different order, or implemented using different logic constructs (e.g., logic gates, looping primitives, conditional logic, and other logic constructs) without changing the overall results or otherwise departing from the true scope of the invention.

The present invention may be embodied in many different forms, including, but in no way limited to, computer program logic for use with a processor (e.g., a microprocessor, microcontroller, digital signal processor, or general purpose computer), programmable logic for use with a programmable logic device (e.g., a Field Programmable Gate Array (FPGA) or other PLD), discrete components, integrated circuitry (e.g., an Application Specific Integrated Circuit (ASIC)), or any other means including any combination thereof.

Computer program logic implementing all or part of the functionality previously described herein may be embodied in various forms, including, but in no way limited to, a source code form, a computer executable form, and various intermediate forms (e.g., forms generated by an assembler, compiler, linker, or locator.) Source code may include a series of computer program instructions implemented in any of various programming languages (e.g., an object code, an assembly language, or a high-level language such as Fortran, C, C++, JAVA, or HTML) for use with various operating systems or operating environments. The source code may define and use various data structures and communication messages. The source code may be in a computer executable form (e.g., via an interpreter), or the source code may be converted (e.g., via a translator, assembler, or compiler) into a computer executable form.

The computer program may be fixed in any form (e.g., source code form, computer executable form, or an intermediate form) either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), a PC card (e.g., PCMCIA card), or other memory device. The computer program may be fixed in any form in a signal that is transmittable to a computer using any of various communication technologies, including, but in no way limited to, analog technologies, digital technologies, optical technologies, wireless technologies, networking technologies, and internetworking technologies. The computer program may be distributed in any form as a removable storage medium with accompanying printed or electronic documentation (e.g., shrink wrapped software or a magnetic tape), preloaded with a computer system (e.g., on system ROM or fixed disk), or distributed from a server or electronic bulletin board over the communication system (e.g., the Internet or World Wide Web.)

Hardware logic (including programmable logic for use with a programmable logic device) implementing all or part of the functionality previously described herein may be designed using traditional manual methods, or may be designed, captured, simulated, or documented electronically using various tools, such as Computer Aided Design (CAD), a hardware description language (e.g., VHDL or AHDL), or a PLD programming language (e.g., PALASM, ABEL, or CUPL.)

The present invention may be embodied in other specific forms without departing from the true scope of the inven-

What is claimed is:

1. A method of encoding a transmission signal to reduce multiple access interference at a receiver, the method comprising:
   receiving a data source signal including a plurality of source symbols into a transmitter;
   encoding the source symbols using low energy encoding forming encoded codewords, which includes producing a sequence of signals forming codewords, each sequence of signals characterized by an energy, the codewords having a length, each codeword signifying a specified source symbol on the basis of a mapping between source symbols and codewords mapped such that each symbol of lower probability of occurrence is associated with a codeword of at least equal energy, the length for the codewords based at least on the number of symbols to be coded;
   applying an identifying pattern to the encoded codewords forming a transmission signal; and
   transmitting the transmission signal on a pre-selected, wireless frequency.

2. The method according to claim 1, wherein the identifying pattern is a unique pseudo-random pattern identifying the data source.

3. A method for encoding according to claim 1, further comprising:
   summing multiple transmission signals to form a summed signal.

4. The method according to claim 3, further comprising: modulating the summed signal on a carrier wave.

5. The method according to claim 1, wherein the transmission signal is a code division multiple access signal.

6. The method according to claim 1 wherein the transmission signal is a direct sequence code division multiple access signal.

7. A method for reducing multiple access interference at a receiver, the method comprising:
   receiving at a multiple access receiver a modulated signal having multiple transmitted signals thereon wherein each transmitted signal is encoded using low energy encoding, which includes producing a sequence of signals forming codewords, each sequence of signals characterized by an energy, the codewords having a length, each codeword signifying a specified source symbol on the basis of a mapping between source symbols and codewords mapped such that each symbol of lower probability of occurrence is associated with a codeword of at least equal energy, the length for the codewords based at least on the number of symbols to be coded;
   identifying a transmitted signal according to a unique identifying pattern within the signal; and
   decoding a transmitted signal using low energy decoding.

8. The method according to claim 7, wherein the unique identifying pattern is a code division multiple access pseudo-random pattern for identifying each data source.

9. A method for determining the capacity of a frequency in a code division multiple access system according to claim 8, further comprising:
   receiving a low energy encoding codeword length;
   receiving a bit energy to noise ratio for the system;
   calculating a maximum number of allowable transmitters based at least upon a low energy encoding codeword length and the system bit energy to noise ratio.

10. The method according to claim 7 further comprising:
    informing a control module of the transmitter that assigns transmission frequencies of a number of allowable transmission signals for a given frequency.

11. The method according to claim 10, further comprising:
    assigning transmitters to a frequency up to the number of allowable transmissions.

12. A method for determining codeword length for a low energy encoded system in order reduce an error probability of receiving an incomplete codeword, the method comprising:
    determining a signal to noise ratio for a low energy encoded frequency in a processor;
    obtaining a length for binary encoded signal based upon a known number of symbols;
    determining a critical length according to the formula $$L_c = \frac{L_b}{1-\alpha_1} \exp[(1-\alpha_1)SNR_{LE}].$$

wherein $L_c$ represents the critical length, $L_b$ represents a minimum length for a binary representation of the possible source symbols, $\alpha_1$ represents a percentage of high bits for a data source, and SNR represents "signal to noise ratio";
    setting the codeword length for low energy encoding to a length that is less than or equal to the critical length; and
    outputting the codeword length from the processor.

13. A system for transmitting transmission signals, the system including:
    a low energy data source encoder for encoding a data source into codewords using low energy encoding, which includes producing a sequence of signals forming codewords, each sequence of signals characterized by an energy, the codewords having a length, each codeword signifying a specified source symbol on the basis of a mapping between source symbols and codewords mapped such that each symbol of lower probability of occurrence is associated with a codeword of at least equal energy, the length for the codewords based at least on the number of symbols to be coded;
    a pseudo-random pattern generator wherein each pseudo-random generator adds a pseudorandom signal to the codewords for the data source forming a transmission signal; and
    a modulator for modulating each transmission signal on a carrier frequency.

14. A system according to claim 13, wherein there are a plurality of low energy data source encoders and a plurality of pseudo-random pattern generators each low energy data source encoder and pseudo-random pattern generator pair processing a separate data source creating a separate transmission signal.

15. A system according to claim 14, further comprising:
    a summer module for summing the plurality of transmission signals.

16. The system according to claim 13, wherein the transmission signals are code division multiple access signals.

17. A receiver for receiving a code division multiple access signal, the receiver comprising:
    a demodulator for removing the carrier frequency from the code division multiple access signal;

a pseudo-random module for separating each low energy encoded signal from the code division multiple access signal, wherein the low energy encoded signal is created by producing a sequence of signals forming codewords, each sequence of signals characterized by an energy, the codewords having a length, each codeword signifying a specified source symbol on the basis of a mapping between source symbols and codewords mapped such that each symbol of lower probability of occurrence is associated with a codeword of at least equal energy, the length for the codewords based at least on the number of symbols to be coded; and a low energy decoder for decoding each low energy encoded signal.

18. A computer program product for use with a computer processor for encoding a transmission signal to reduce multiple access interference at a receiver, the computer program product comprising a computer readable storage medium having a stored computer executable program code thereon, the computer code comprising:

computer code for receiving a data source signal including a plurality of source symbols;

computer code for encoding the source symbols using low energy encoding forming encoded codewords, which includes computer code for producing a sequence of signals forming codewords, each sequence of signals characterized by an energy, the codewords having a length, each codeword signifying a specified source symbol on the basis of a mapping between source symbols and codewords mapped such that each symbol of lower probability of occurrence is associated with a codeword of at least equal energy, the length for the codewords based at least on the number of symbols to be coded;

computer code for applying pseudo-random pattern to the encoded codewords forming a transmission signal; and computer code for transmitting the transmission signal on a pre-selected, wireless frequency.

19. The computer program product according to claim 18, further comprising:

computer code for summing multiple transmission signals to form a summed signal.

20. The computer program product according to claim 19, further comprising:

computer code for modulating the summed signal on a carrier wave.

21. A computer program product for use with a computer processor for reducing multiple access interference at a receiver, the computer program product comprising a computer readable storage medium having a stored computer executable program code thereon, the computer code comprising:

computer code for receiving a modulated signal having multiple transmitted signals thereon wherein each transmitted signal is encoded using low energy encoding, the low energy encoding provided by computer code for producing a sequence of signals forming codewords, each sequence of signals characterized by an energy, the codewords having a length, each codeword signifying a specified source symbol on the basis of a mapping between source symbols and codewords mapped such that each symbol of lower probability of occurrence is associated with a codeword of at least equal energy, the length for the codewords based at least on the number of symbols to be coded;

computer code for identifying each transmitted signal according to a unique pseudorandom number within the signal;

computer code for decoding each transmitted signal using low energy decoding; and computer code for storing the decoded signal in a memory.

22. A computer program product for use with a computer processor for determining codeword length for a low energy encoded system in order to reduce an error probability of receiving an incomplete codeword, the computer program product comprising a computer readable storage medium having a stored computer executable program code thereon, the computer code comprising:

computer code for determining a signal to noise ratio for a low energy encoded frequency;

computer code for obtaining a length for binary encoded signal based upon a known number of symbols;

computer code for determining a critical length according to the formula, $$L_c = \frac{L_b}{1-\alpha_1}\exp[(1-\alpha_1)SNR_{LE}].$$

wherein $L_c$ represents the critical length, $L_b$ represents a minimum length for a binary representation of the possible source symbols, $\alpha_1$ represents a percentage of high bits for a data source, and SNR represents "signal to noise ratio";

computer code for setting the codeword length for low energy encoding to a length that is less than or equal to the critical length; and computer code for storing the codeword length to a memory.

* * * * *

UNITED STATES PATENT AND TRADEMARK OFFICE
CERTIFICATE OF CORRECTION

PATENT NO.        : 7,376,105 B2
APPLICATION NO. : 10/236058
DATED             : May 20, 2008
INVENTOR(S)      : Asada et al.

It is certified that error appears in the above-identified patent and that said Letters Patent is hereby corrected as shown below:

In col. 4, line 18, in the equation at the start of the line, the last term in curly brackets incorrectly reads as follows: m subscript 2 superscript I. The equation incorrectly appears in the Letters Patent as follows:

$$M_0 = \{m_1, \ldots, m_{2^I}\}$$

The correct equation should read as follows: m subscript 2 superscript L. The correct equation should appear in the Letters Patent as follows:

$$M_0 = \{m_1, \ldots, m_{2^L}\}$$

Signed and Sealed this

Twenty-ninth Day of July, 2008

JON W. DUDAS
*Director of the United States Patent and Trademark Office*